United States Patent Office 2,987,271
Patented June 6, 1961

2,987,271
ARRANGEMENT OF JET PROPULSION ENGINES AND UNDERCARRIAGES IN AIRCRAFT

Bernard Oliver Heath, Lea, near Preston, and Geoffrey Francis Sharples, St. Annes-on-Sea, England, assignors to The English Electric Company Limited, London, England, a British company
Filed Sept. 25, 1959, Ser. No. 842,472
Claims priority, application Great Britain Nov. 11, 1958
2 Claims. (Cl. 244—15)

This invention relates to a development of the aircraft described and claimed in the patent application Ser. No. 842,471, filed September 25, 1959, by Bernard Oliver Heath and assigned to The English Electric Company Limited.

According to the present invention two double rocket motor units and the peroxide tank for their operation are suspended on a triangulated tubular structure laterally attached to the longerons of the engine bay and connected by a central thrust member to the bottom of the rear bulkhead of the engine bay.

Preferably each rocket motor unit has a three-point attachment on the said structure.

In order that the invention may be clearly understood an embodiment thereof will now be described with reference to the accompanying diagrammatic drawings, in which.

Figure 1:
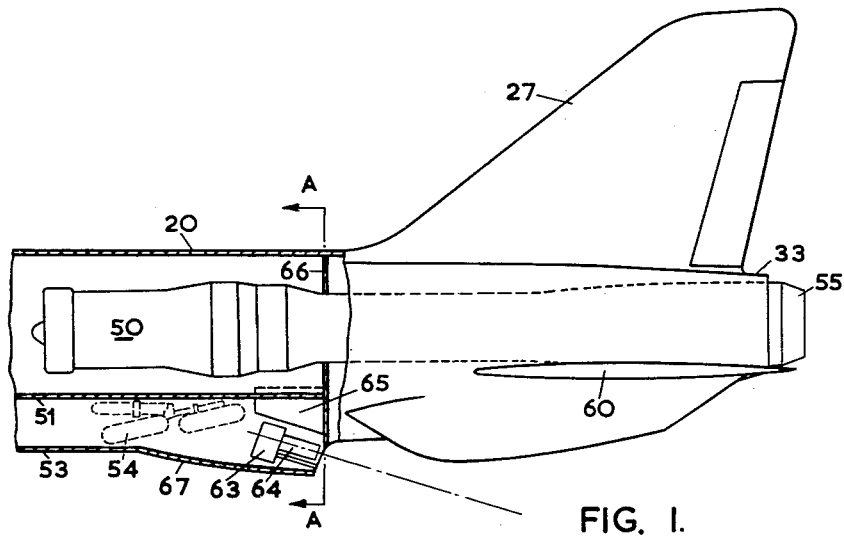
FIG. 1 is a side elevation partly in section, of the rear fuselage portion of an aircraft according to the present invention.
Figure 2:
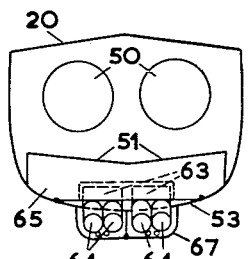
FIG. 2 is a cross section to FIG. 1 on the line A—A.

The rear portion of the centre fuselage 20 of the aircraft carries a pair of turbo jet propulsion engines 50 in a bay having a rear bulkhead 66. The jet propulsion engines 50 discharge their propulsive jets through jet pipes 55 emerging through a rear fairing 33. A fin 27 and tailplane 60 are attached to the rear part of the fuselage 20 behind the bulkhead 66.

Below the engine floor 51 the main undercarriage 54 is arranged retractably into the same bay wherein the turbo jet propulsion engines 50 are located above the said floor 51. As the length of the turbo jet propulsion engines 50, which determines the length of the bay, exceeds that of the main undercarriage 54, there is sufficient space left behind the latter to accommodate two double rocket motor units, each of which is designated 63 as a whole, and a tank 65 for the peroxide needed for the operation of the rocket motors 64 thereof. The undercarriage 54 is supported from the fuselage structure by two legs 56 and 57. The doors 53 of the undercarriage bay are provided with bulges 67 covering in their closed position the rocket motor units 63 from underneath while allowing the same to discharge their propulsive gases to the rear.

The thrust lines of the rocket motors 64 are inclined and pass through or close to the centre of gravity of the aircraft which lies near the forward ends of the turbo jet propulsion engines 50. In the embodiment illustrated these thrust lines are parallel to one another, but if desired, could be made to converge so as to pass through a common point at or close to the centre of gravity of the aircraft.

Figure 3:
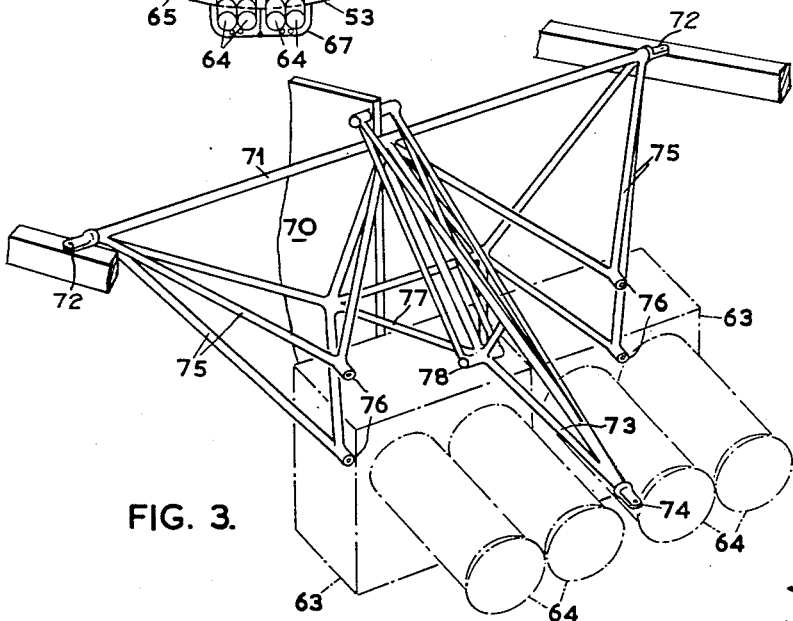
FIG. 3 is a perspective view on a larger scale of the triangulated tubular structure engine mounting for the rocket motor units.
Figure 4:
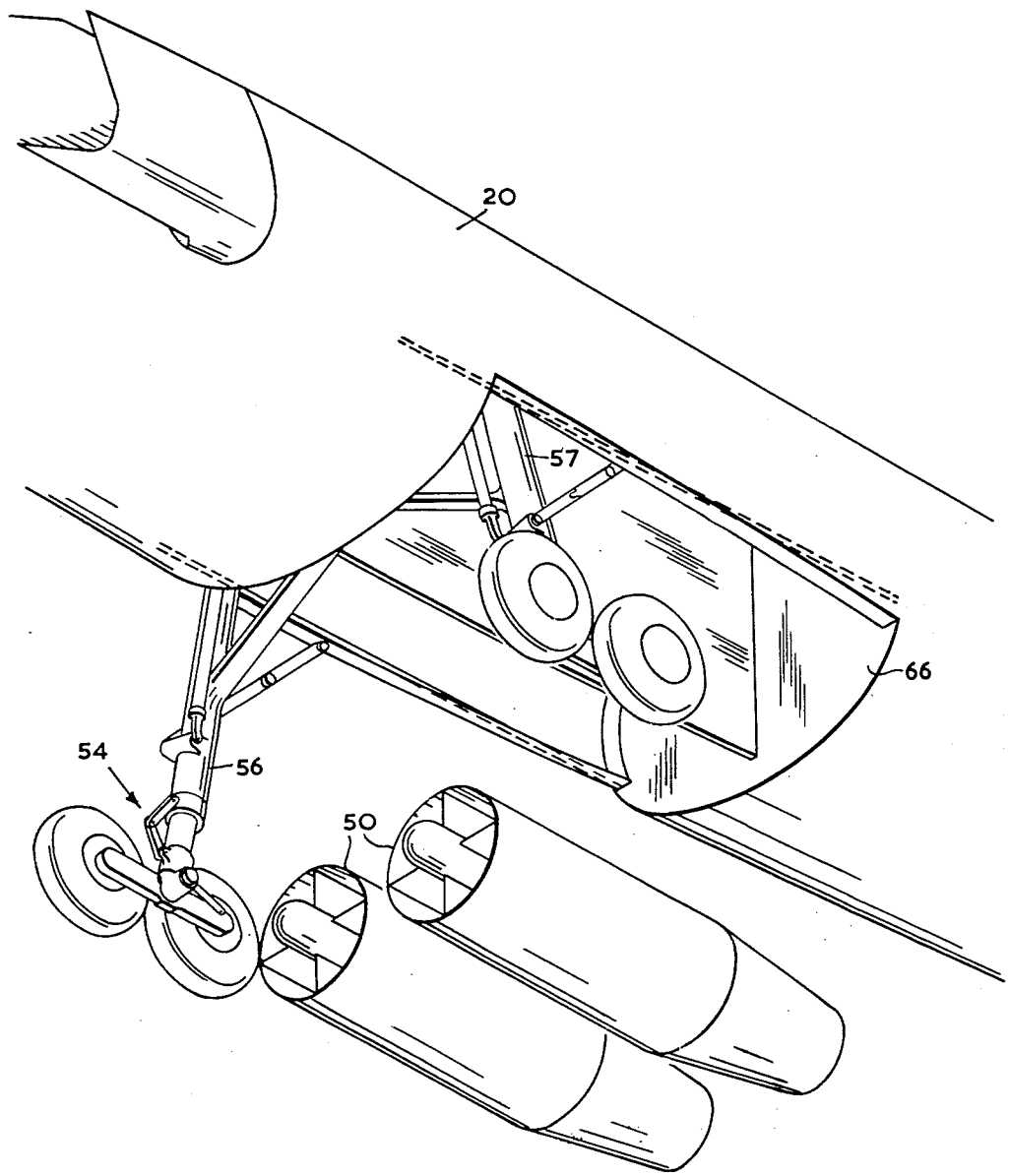
FIG. 4 is a perspective view illustrating the removal of the engines.

As shown in FIG. 3 a triangulated tubular engine mounting structure, denoted 70 as a whole, is attached with its transverse tube 71 by means of eyes 72 to the longerons 79 of the engine bay of the aircraft, and by means of a triangulated central thrust member 73 and an eye 74 at its end to the rear bulkhead 66 of the engine bay at the centre line of the bottom skin of the fuselage 20.

Each rocket motor unit 63 is attached near its front end at one point 78 to the said central thrust member 73 and at two points 76 to tubes 75 forming a triangulated structure with the transverse tube 71 and with tubes 77 linking up with the said central thrust member 73. Thus a three-point attachment is provided for each rocket motor unit 63.

The peroxide tank 65 is arranged under the engine floor 51, ahead of the rear bulkhead 66 and above the upper tubes 75 of the triangulated tubular rocket engine mounting 70.

What we claim as our invention and desire to secure by Letters Patent is:

1. An aircraft comprising in combination: a fuselage, a jet propulsion engine mounted in the said fuselage above a bay in the said fuselage, a main undercarriage mounted on the said fuselage retractable into but in the retracted position not fully occupying the said bay and having two legs spaced apart from one another in the down position and allowing access to the said engine between them from below and the withdrawal of the said engine from the fuselage through the said bay and between them, longerons mounted in the said fuselage flanking the said bay, a bulkhead mounted in the said fuselage at the rear of said bay and having a central thrust member at its bottom, a triangulated tubular structure detachably attached laterally to the said longerons and centrally to the said thrust member, and two rocket motor units and the peroxide tank for their operation suspended on the said triangulated tubular structure, the said triangulated tubular structure, rocket motor units and peroxide tank being mounted in the space of the said bay not occupied by the said undercarriage in its up position, and being withdrawn prior to withdrawing the said engine from the said bay.

2. An aircraft as claimed in claim 1, wherein each of the said rocket motor units has a three point attachment to the said triangulated tubular structure.

No references cited.